(12) United States Patent
Baik et al.

(10) Patent No.: US 11,500,182 B2
(45) Date of Patent: Nov. 15, 2022

(54) OPTICAL IMAGING SYSTEM

(71) Applicant: SAMSUNG ELECTRO-MECHANICS CO., LTD., Suwon-si (KR)

(72) Inventors: Jae Hyun Baik, Suwon-si (KR); Yong Joo Jo, Suwon-si (KR); Tae Youn Lee, Suwon-si (KR); Jae Hyuk Huh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 270 days.

(21) Appl. No.: 16/136,473

(22) Filed: Sep. 20, 2018

(65) Prior Publication Data

US 2019/0227281 A1    Jul. 25, 2019

(30) Foreign Application Priority Data

Jan. 23, 2018    (KR) .................. 10-2018-0008289

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC ...... G02B 9/60; G02B 13/0045; G02B 13/04; G02B 13/06
USPC .................................................. 359/763–769
See application file for complete search history.

(56) References Cited

U.S. PATENT DOCUMENTS

| | | | | |
|---|---|---|---|---|
| 4,525,038 A * | 6/1985 | Muller | ................... | G02B 13/04 359/720 |
| 5,255,121 A * | 10/1993 | Suzuki | ................... | G02B 25/04 359/643 |
| 5,808,808 A * | 9/1998 | Yamanashi | ............ | G02B 13/06 359/682 |
| 5,963,381 A * | 10/1999 | Ori | ......................... | G02B 13/04 359/752 |
| 6,940,662 B2 * | 9/2005 | Sekita | .................... | G02B 13/04 359/749 |
| 7,023,628 B1 * | 4/2006 | Ning | ..................... | G02B 13/06 359/680 |

(Continued)

FOREIGN PATENT DOCUMENTS

| | | |
|---|---|---|
| CN | 101231379 A | 7/2008 |
| CN | 101782676 A | 7/2010 |

(Continued)

OTHER PUBLICATIONS

Lohmann, Adolf W. "Scaling Laws for Lens Systems." Applied Optics, vol. 28, No. 23, Dec. 1, 1989, pp. 4996-4998. (Year: 1989).*

(Continued)

*Primary Examiner* — Zachary W Wilkes
(74) *Attorney, Agent, or Firm* — NSIP Law

(57) ABSTRACT

An optical imaging system includes: a first lens having refractive power, a second lens having refractive power, a third lens having refractive power, a fourth lens having refractive power, and a fifth lens having refractive power. Here, the first lens, the third lens, and the fifth lens may have refractive indices of about 1.6 or more, and an entire field of view of the optical imaging system may be about 120° or more.

17 Claims, 8 Drawing Sheets

(56) References Cited

U.S. PATENT DOCUMENTS

| | | | | |
|---|---|---|---|---|
| 7,239,456 | B2* | 7/2007 | Kimura | G02B 13/04 359/740 |
| 7,663,814 | B2* | 2/2010 | Kitahara | G02B 13/146 359/770 |
| 7,697,220 | B2* | 4/2010 | Iyama | G02B 13/18 359/753 |
| 8,780,464 | B2 | 7/2014 | Huang | |
| 8,792,185 | B2 | 7/2014 | Hsu et al. | |
| 8,922,910 | B2* | 12/2014 | Yamakawa | G02B 13/06 359/714 |
| 9,036,272 | B2* | 5/2015 | Huang | G02B 13/0045 359/757 |
| 9,235,033 | B2* | 1/2016 | Tsai | G02B 13/0045 |
| 9,250,420 | B2 | 2/2016 | Hsu et al. | |
| 9,395,515 | B2* | 7/2016 | Miyano | G02B 13/06 |
| 9,696,519 | B1* | 7/2017 | Chen | G02B 13/0015 |
| 9,703,077 | B2* | 7/2017 | Liu | G02B 13/0045 |
| 9,823,450 | B2* | 11/2017 | Tang | G02B 13/06 |
| 9,864,172 | B1 | 1/2018 | Tsai et al. | |
| 10,001,627 | B2* | 6/2018 | Hsu | G02B 9/60 |
| 10,007,097 | B2* | 6/2018 | Tang | G02B 13/06 |
| 10,107,993 | B2* | 10/2018 | Amanai | G02B 13/0045 |
| 10,209,488 | B2* | 2/2019 | Tseng | G02B 13/146 |
| 11,016,269 | B2 | 5/2021 | Zhao et al. | |
| 2008/0174887 | A1 | 7/2008 | Asami | |
| 2013/0308206 | A1* | 11/2013 | Hsu | G02B 13/0045 359/714 |
| 2013/0321932 | A1 | 12/2013 | Hsu et al. | |
| 2015/0338610 | A1* | 11/2015 | Hsieh | G02B 13/0015 348/360 |
| 2017/0023770 | A1 | 1/2017 | Teraoka | |
| 2017/0097498 | A1 | 4/2017 | Amanai | |
| 2017/0102521 | A1 | 4/2017 | Son | |
| 2017/0131519 | A1 | 5/2017 | Hsieh et al. | |
| 2017/0153449 | A1 | 6/2017 | Mori | |
| 2017/0168264 | A1 | 6/2017 | Chen et al. | |
| 2017/0168266 | A1 | 6/2017 | Hsu et al. | |
| 2017/0176720 | A1 | 6/2017 | Zhao et al. | |
| 2017/0184817 | A1 | 6/2017 | Lee | |
| 2020/0192061 | A1* | 6/2020 | Liao | G02B 27/0025 |

FOREIGN PATENT DOCUMENTS

| | | |
|---|---|---|
| CN | 103424847 A | 12/2013 |
| CN | 105467556 A | 4/2016 |
| CN | 106415350 A | 2/2017 |
| CN | 106569313 A | 4/2017 |
| CN | 111045208 A | 4/2020 |
| JP | 2017-68164 A | 4/2017 |
| JP | 2017-102183 A | 6/2017 |
| KR | 10-2014-0023552 A | 2/2014 |
| KR | 10-2016-0004826 A | 1/2016 |
| KR | 10-2017-0077359 A | 7/2017 |

OTHER PUBLICATIONS

Korean Office Action dated Dec. 11, 2018 in corresponding Korean Patent Application No. 10-2018-0008289 (8 pages in English, 5 pages in Korean).

Korean Office Action dated Jun. 10, 2019 in counterpart Korean Patent Application No. 10-2018-0008289 (8 pages in English and 5 pages in Korean).

Chinese Office Action dated Nov. 3, 2020 in counterpart Chinese Patent Application No. 201811415897.9 (7 pages in English and 10 pages in Chinese).

Korean Office Action dated Jan. 11, 2021, in counterpart Korean Patent Application No. 10-2020-0007486 (7 pages in English and 4 pages in Korean).

Korean Office Action dated Sep. 15, 2021, in counterpart Korean Patent Application No. 10-2021-0110076 (9 pages in English, 5 pages in Korean).

Chinese Office Action dated Jul. 5, 2021, in counterpart Chinese Patent Application No. 201811415897.9 (12 pages in English and 13 pages in Chinese).

Korean Office Action dated Jan. 11, 2022, in counterpart Korean Patent Application No. 10-2021-0110076 (7 pages in English, 4 pages in Korean).

* cited by examiner

OPTICAL IMAGING SYSTEM

CROSS-REFERENCE TO RELATED APPLICATION(S)

This application claims the benefit under 35 USC § 119(a) of Korean Patent Application No. 10-2018-0008289 filed on Jan. 23, 2018 in the Korean Intellectual Property Office, the entire disclosure of which is incorporated herein by reference for all purposes.

BACKGROUND

1. Field

The following description relates to an optical imaging system including five or more lenses.

2. Description of Related Art

Small camera modules may be mounted in mobile communications terminals. For example, small camera modules may be mounted in thin devices such as mobile phones, or the like. A small camera module, such as this, includes an optical imaging system including a small number of lenses so that it may be thin. For example, the optical imaging system of a small camera module may include four or fewer lenses. However, it may be difficult to implement a low F number and a wide field of view in the optical imaging system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, and a fifth lens sequentially arranged from an object side, wherein the first lens, the third lens, and the fifth lens each have a refractive indices index of 1.6 or more, and the field of view of the optical imaging system is 100° or more.

The optical imaging system may include an object-side surface of the first lens being convex.

The optical imaging system may include an object-side surface of the second lens being convex.

The optical imaging system may include an object-side surface of the third lens being convex.

The optical imaging system may include an object-side surface of the fourth lens being convex.

The optical imaging system may include an object-side surface of the fifth lens being convex.

The optical imaging system may have an F number being less than 2.3.

In another general aspect, an optical imaging system includes a first lens, a second lens, a third lens, a fourth lens, and a fifth lens sequentially arranged from an object side, wherein the first lens, the third lens, and the fifth lens have refractive indices index of 1.6 or more, and an object-side surface of the fourth lens is convex.

The optical imaging system may have one or more of the refractive indices of the first lens, the third lens, and and/or the fifth lens being 1.66 or more.

The optical imaging system may have an F number being less than about 2.3.

The optical imaging system may have TTL/ImgHT<2.0 where TTL is a distance from an object-side surface of the first lens to an imaging plane, and ImgHT is half of a diagonal length of the imaging plane.

The optical imaging system may have f≤1.76 where f is an overall focal length in millimeters of the optical imaging system.

The optical imaging system may have a field of view of 120° or more.

The optical imaging system may have 2.86≤CT4/ET4 where CT4 is a thickness of an optical axis portion of the fourth lens, and ET4 is a minimum thickness of an edge portion of the fourth lens.

The optical imaging system may have 0.53<CT5/sag5 where CT5 is a thickness of an optical axis portion of the fifth lens, and sag5 is an SAG is a SAG at an edge of an image-side surface of the fifth lens.

The optical imaging system may have |f1/f|<4.0 where f is an overall focal length in millimeters of the optical imaging system, and f1 is a focal length of the first lens.

A mobile communications terminal may include an optical imaging system that includes a first lens, a second lens, a third lens, a fourth lens, and a fifth lens sequentially arranged from an object side, wherein the first lens, the third lens, and the fifth lens each have a refractive indices index of about 1.6 or more, and the field of view of the optical imaging system is about 100° or more.

The mobile communications terminal may have an F number less than about 2.3.

The mobile communications terminal may have a field of view of about 100° to about 120°.

In aspects the optical imaging system may have a low F number of about 2.3 or less, or about 2.0 to about 2.3 and a wide field of view of about 100° or more, or about 100° to about 120°.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
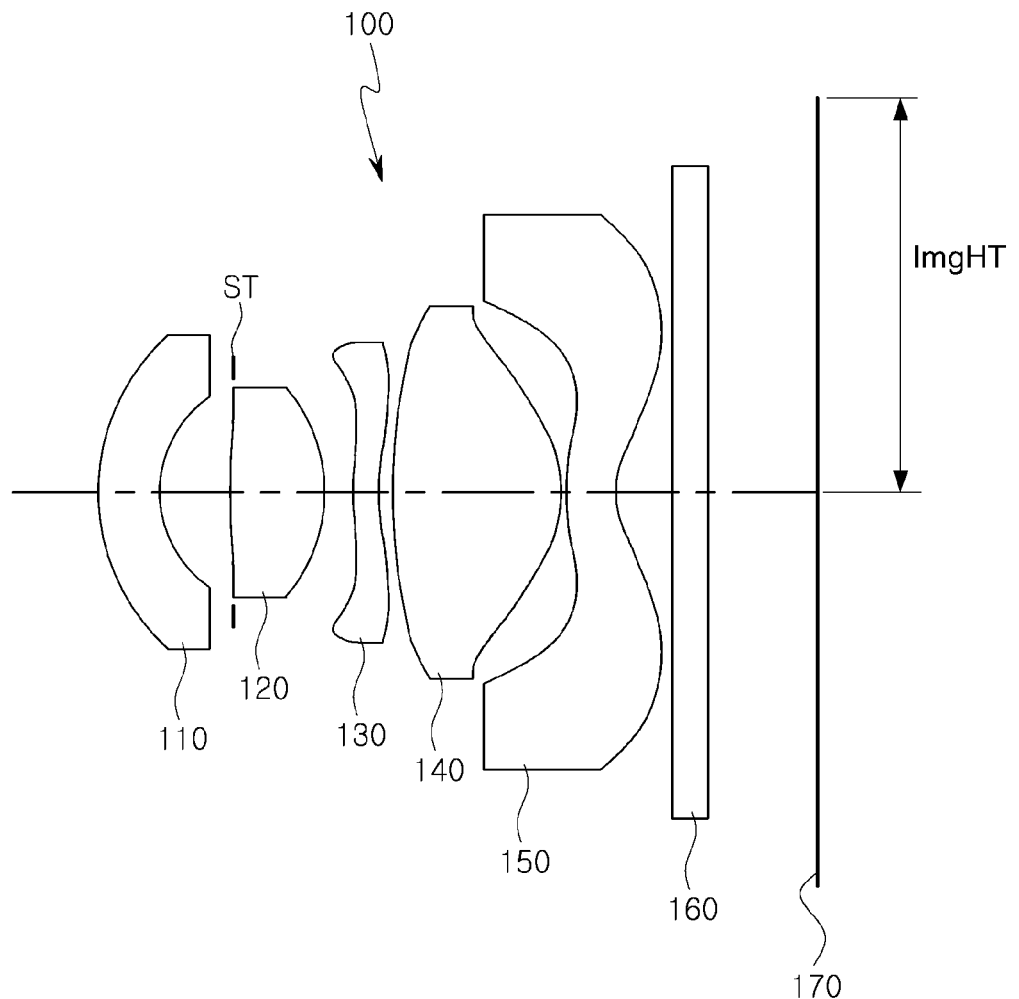
FIG. 1 is a view illustrating an optical imaging system according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In addition, in the present specification, a first lens refers to a lens closest to an object (or a subject), while a fifth lens refers to a lens closest to an imaging plane (or an image sensor). In addition, all radii of curvature and thicknesses of lenses, TTL (a distance from the object-side surface of the first lens to the imaging plane), ImgHT (a height of the imaging plane), and focal lengths are represented by millimeters (mm). Further, thicknesses of the lenses, gaps between the lenses, and the TTL are distances in optical axes of the lenses. Further, in descriptions of shapes of the lenses, the meaning that one surface of a lens is convex is that an optical axis portion of a corresponding surface is convex, and the meaning that one surface of a lens is concave is that an optical axis portion of a corresponding surface is concave. Therefore, although it may be described that one surface of a lens is convex, an edge portion of the lens may be concave. Likewise, although it may be described that one surface of a lens is concave, an edge portion of the lens may be convex.

An optical imaging system may include five lenses sequentially arranged from an object side toward the imaging plane. For example, the optical imaging system may include a first lens, a second lens, a third lens, a fourth lens, and a fifth lens that are sequentially arranged. The first to fifth lenses may be arranged with a predetermined interval therebetween. For example, a predetermined interval may be formed between an image-side surface of the first lens and an object-side surface of the second lens. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The first lens may include refractive power. For example, the first lens may include negative refractive power.

One surface of the first lens may be convex. For example, an object-side surface of the first lens may be convex. The first lens may have an aspherical surface. For example, both surfaces of the first lens may be aspherical. The first lens may be formed of a material having high light transmissivity and excellent workability. For example, the first lens may be formed of plastic. However, a material of the first lens is not limited to plastic. For example, the first lens may be formed of glass.

The first lens may have a predetermined refractive index. For example, the refractive index of the first lens may be about 1.6 or more, or may be about 1.6 to about 1.7. The first lens may have a predetermined Abbe number. For example, the Abbe number of the first lens may be less than about 22, or be between about 20 and 22.

The second lens may include refractive power. For example, the second lens may include positive refractive power.

One surface of the second lens may be convex. For example, an object-side surface of the second lens may be convex. The second lens may include an aspherical surface. For example, both surfaces of the second lens may be aspherical. The second lens may be formed of a material having high light transmissivity and excellent workability. For example, the second lens may be formed of plastic. However, a material of the second lens is not limited to plastic. For example, the second lens may also be formed of glass.

The second lens may have a refractive index smaller than those of other lenses. For example, the refractive index of the second lens may be less than 1.6, or between about 1.5 to about 1.6. The second lens may have a predetermined Abbe number. For example, the Abbe number of the second lens may be about 50 or more, or may be between about 50 and 57.

The third lens may include refractive power. For example, the third lens may include negative refractive power.

One surface of the third lens may be convex. For example, an object-side surface of the third lens may be convex. The third lens may have an aspherical surface. For example, both surfaces of the third lens may be aspherical. The third lens may have an inflection point. For example, one or more inflection points may be formed on the object-side surface or an image-side surface of the third lens.

The third lens may be formed of a material having high light transmissivity and excellent workability. For example, the third lens may be formed of plastic. However, a material of the third lens is not limited to plastic. For example, the third lens may be formed of glass.

The third lens may have a refractive index that is substantially similar to, or substantially the same as, that of the first lens. For example, the refractive index of the third lens may be about 1.6 or more, or about 1.6 to about 1.7. The third lens may have an Abbe number similar to that of the first lens. For example, the Abbe number of the third lens may be less than about 22, or about 20 to about 22.

The fourth lens may include refractive power. For example, the fourth lens may include positive refractive power.

One surface of the fourth lens may be convex. For example, an object-side surface of the fourth lens may be convex. The fourth lens may include an aspherical surface. For example, both surfaces of the fourth lens may be aspherical. The fourth lens may be formed of a material having high light transmissivity and excellent workability. For example, the fourth lens may be formed of plastic. However, a material of the fourth lens is not limited to plastic. For example, the fourth lens may be formed of glass.

The fourth lens may have a refractive index that is substantially similar to, or substantially the same as, that of the second lens. For example, the refractive index of the fourth lens may be less than about 1.6, or be between about 1.5 and 1.6. The fourth lens may have an Abbe number greater than that of the fifth lens. For example, the Abbe number of the fourth lens may be about 50 or more, or about 50 to 57.

The fifth lens may include refractive power. For example, the fifth lens may include negative refractive power.

One surface of the fifth lens may be convex. For example, an object-side surface of the fifth lens may be convex. The fifth lens may include an aspherical surface. For example, both surfaces of the fifth lens may be aspherical. The fifth lens may have an inflection point. For example, one or more inflection points may be formed on the object-side surface or an image-side surface of the fifth lens.

The fifth lens may be formed of a material having high light transmissivity and excellent workability. For example, the fifth lens may be formed of plastic. However, a material of the fifth lens is not limited to plastic. For example, the fifth lens may be formed of glass.

The fifth lens may have a refractive index that is substantially similar to, or substantially the same as, that of the first lens. For example, the refractive index of the fifth lens may be about 1.6 or more, or be between about 1.6 and 1.7. The fifth lens may have a predetermined Abbe number. For example, the Abbe number of the fifth lens may be less than about 22, or be between about 20 and 22.

In the optical imaging system, the aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}. \quad \text{Equation 1}$$

Here, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance r and a tangential plane meeting the apex of the aspherical surface of the lens.

The optical imaging system may further include a filter, an image sensor, and/or a stop.

The filter may be disposed between a rearmost lens and the image sensor. The filter may be configured to block infrared wavelengths of light. The image sensor may form the imaging plane. The stop may be disposed in order to control an amount of light incident to the lenses. The stop may be disposed between the first and second lenses. However, the stop is not limited to being disposed between the first and second lenses.

The optical imaging system may satisfy one or more of the following Conditional Expressions:

| | |
|---|---|
| Conditional Expression 1 | F No. < 2.3 |
| Conditional Expression 2 | TTL/ImgHT < 2.0 |
| Conditional Expression 3 | f ≤ 1.76 |
| Conditional Expression 4 | 100° ≤ FOV |
| Conditional Expression 5 | 120° ≤ FOV |
| Conditional Expression 6 | 2.86 ≤ CT4/ET4 |
| Conditional Expression 7 | −36 < V1 − V2 |
| Conditional Expression 8 | V4 − V5 < 36 |
| Conditional Expression 9 | 0.53 < CT5/sag5 |
| Conditional Expression 10 | 1.60 < Nd1 |
| Conditional Expression 11 | 1.60 < Nd3 |
| Conditional Expression 12 | 1.60 < Nd5 |
| Conditional Expression 13 | |f1/f| < 4.0 |
| Conditional Expression 14 | 4.0 < |f3/f| |

Here, TTL is a distance from the object-side surface of the first lens to the imaging plane, ImgHT is half of a diagonal length of the imaging plane, f is an overall focal length of the optical imaging system, FOV is an entire field of view of the optical imaging system, CT4 is a thickness of an optical axis portion of the fourth lens, ET4 is a minimum thickness of an edge portion of the fourth lens, CT5 is a thickness of an optical axis portion of the fifth lens, sag5 is a SAG (sagitta) at an edge of the image-side surface of the fifth lens, Nd1 is a refractive index of the first lens, Nd3 is a refractive index of the third lens, Nd5 is a refractive index of the fifth lens, f1 is a focal length of the first lens, and f3 is a focal length of the third lens.

Next, optical imaging systems according to several embodiments will be described.

An optical imaging system according to a first embodiment will be described with reference to FIG. 1.

The first lens 110 may have negative refractive power, and an object-side surface thereof may be convex and an image-side surface thereof may be concave. The second lens 120 may have positive refractive power, and an object-side surface thereof may be convex and an image-side surface thereof may be convex. The third lens 130 may have negative refractive power, and an object-side surface thereof may be convex and an image-side surface thereof may be concave. In addition, inflection points may be formed on the object-side surface and the image-side surface of the third lens 130. As an example, the object-side surface of the third lens 130 may be convex in a paraxial portion thereof and be concave in an edge portion thereof, and the image-side surface of the third lens 130 may be concave in a paraxial portion thereof and be convex in an edge portion thereof. The fourth lens 140 may have positive refractive power, and an object-side surface thereof may be convex and an image-side surface thereof may be convex. The fifth lens 150 may have negative refractive power, and an object-side surface thereof may be convex and an image-side surface thereof may be concave. In addition, inflection points may be formed on the object-side surface and the image-side surface of the fifth lens 150. As an example, the object-side surface of the fifth lens 150 may be convex in a paraxial portion thereof and be concave in an edge portion thereof, and the image-side surface of the fifth lens 150 may be concave in a paraxial portion thereof and be convex in an edge portion thereof.

The optical imaging system 100 may include an image sensor 170 forming an imaging plane. The optical imaging system 100 may include a filter 160. The filter 160 may be disposed between the fifth lens 150 and the image sensor 170. The optical imaging system 100 may include a stop ST. The stop ST may be disposed between the first lens 110 and the second lens 120.

In the optical imaging system 100, the first lens 110, the third lens 130, and the fifth lens 150 may have refractive indices greater than those of the other lenses. In detail, the first lens 110, the third lens 130, and the fifth lens 150 may have refractive indices of about 1.661, and the second lens 120 and the fourth lens 140 may have refractive indices of about 1.554, smaller than those of the first lens 110, the third lens 130, and the fifth lens 150.

In the optical imaging system 100, the third lens 130 may have the greatest focal length. In an embodiment, a focal length of the third lens 130 may be about −21.40, and focal lengths of the other lenses may be greater than that of the third lens 130.

Figure 2:
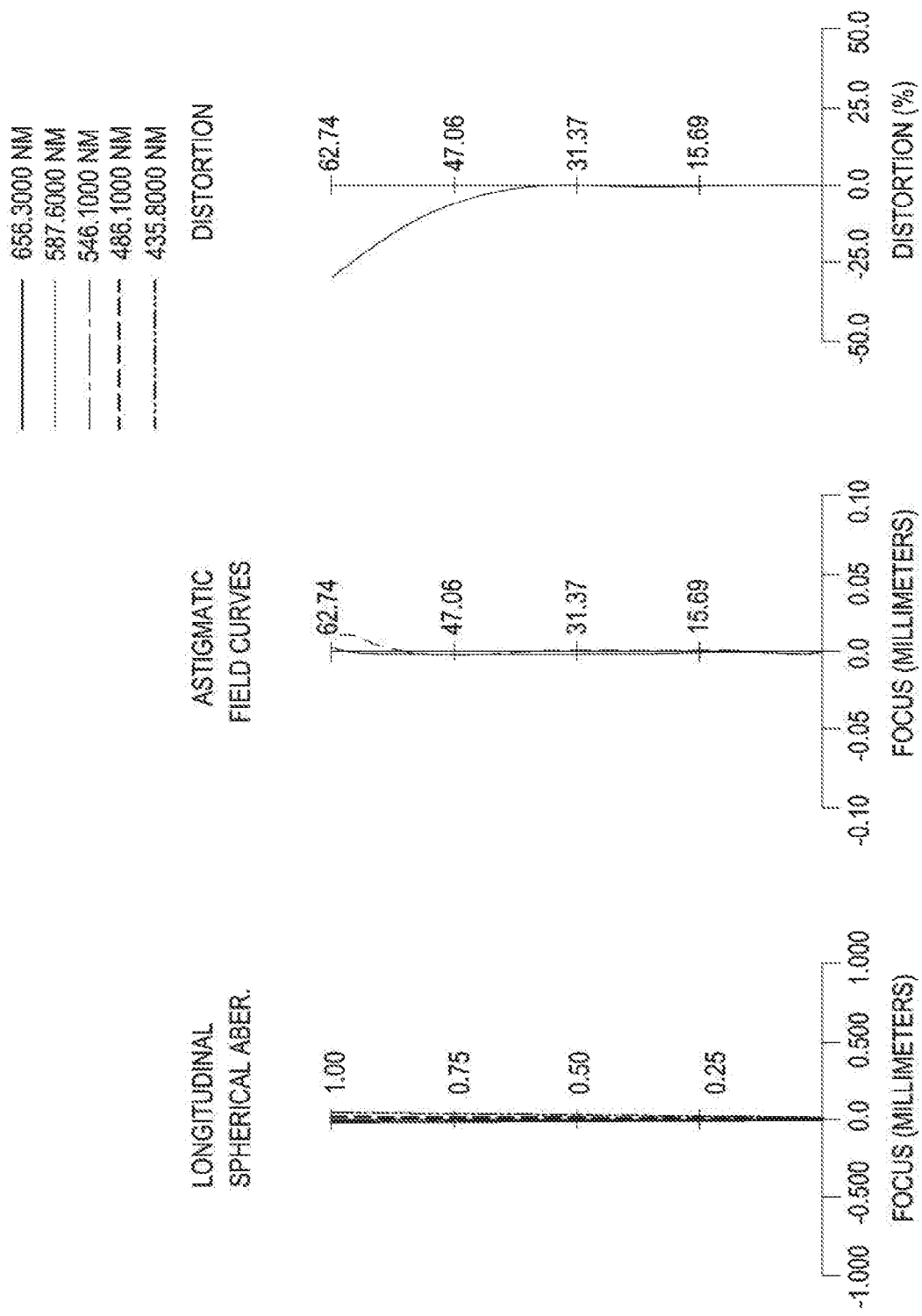
FIG. 2 shows graphs representing aberration curves of an optical imaging system as illustrated in FIG. 1.

The optical imaging system according to an embodiment may have aberration characteristics as illustrated in FIG. 2. Table 1 shows characteristics of lenses of the optical imaging system according to an embodiment, and Table 2 shows aspherical characteristics of the optical imaging system according to an embodiment.

TABLE 1

First Emobodiment
f = 1.76 F No. = 2.26 FOV = 120° TTL = 4.210

| Surface No. | Element | Radius of Curvature | Thickness/ Distance | Refractive Index | Abbe Number | Focal Length |
|---|---|---|---|---|---|---|
| S1 | First Lens | 1.8272 | 0.3569 | 1.661 | 20.353 | −3.277 |
| S2 | | 0.9141 | 0.4108 | | | |
| S3 | Second Lens | 3.9101 | 0.5588 | 1.544 | 56.113 | 2.330 |
| S4 | | −1.7813 | 0.1627 | | | |
| S5 | Third Lens | 1.5712 | 0.1542 | 1.661 | 20.353 | −21.396 |
| S6 | | 1.3589 | 0.0941 | | | |
| S7 | Fourth Lens | 11.8423 | 0.9735 | 1.544 | 56.113 | 1.261 |
| S8 | | −0.7073 | 0.0300 | | | |
| S9 | Fifth Lens | 1.1889 | 0.2964 | 1.661 | 20.353 | −1.708 |
| S10 | | 0.5216 | 0.3234 | | | |
| S11 | Filter | Infinity | 0.2100 | 1.517 | 64.197 | |
| S12 | | Infinity | 0.6362 | | | |
| S13 | Imaging Plane | Infinity | 0.0033 | | | |

TABLE 2

| | First Embodiment | | | | | | |
|---|---|---|---|---|---|---|---|
| | S1 | S2 | S3 | S4 | S5 | S6 | S7 |
| Radius of Curvature | 1.827225 | 0.914142 | 3.910097 | −1.781266 | 1.571183 | 1.358865 | 11.842302 |
| K | 0.000000 | 0.000000 | −8.401287 | 2.972624 | 0.000000 | −10.250335 | 93.000000 |
| A | 0.227844 | 0.590747 | −0.121427 | −0.732900 | −1.329561 | −0.293090 | 0.338870 |
| B | −0.117480 | 0.250121 | 1.263999 | 1.897575 | 1.583851 | −0.872037 | −0.966386 |
| C | 0.065547 | −0.354051 | −27.117707 | −9.329856 | −4.108482 | 3.597064 | 1.644401 |
| D | 0.186975 | 11.152435 | 231.208787 | 31.252425 | 14.537892 | −5.191226 | −1.611421 |
| E | −0.315675 | −14.942084 | −1016.812218 | −63.404808 | −26.675815 | 3.300072 | 0.874709 |

TABLE 2-continued

| | | | | | | | |
|---|---|---|---|---|---|---|---|
| F | 0.103098 | 0.079450 | 1720.364702 | 47.165852 | 17.388764 | −0.766556 | −0.200940 |
| G | 0.000000 | 0.000000 | 0.000000 | 0.000000 | 0.000000 | 0.000000 | 0.000000 |
| H | 0.000000 | 0.000000 | 0.000000 | 0.000000 | 0.000000 | 0.000000 | 0.000000 |
| J | 0.000000 | 0.000000 | 0.000000 | 0.000000 | 0.000000 | 0.000000 | 0.000000 |

| | First Embodiment | | |
|---|---|---|---|
| | S8 | S9 | S10 |
| Radius of Curvature | −0.707278 | 1.188851 | 0.521628 |
| K | −0.803139 | 0.000000 | −3.335920 |
| A | 0.713044 | −1.010705 | −0.419523 |
| B | −1.652933 | 0.875290 | 0.382958 |
| C | 3.111453 | −1.815142 | −0.252569 |
| D | −3.391064 | 3.289688 | 0.104104 |
| E | 1.948480 | −3.781265 | −0.026347 |
| F | −0.430857 | 2.219282 | 0.003823 |
| G | 0.000000 | 0.515963 | −0.000251 |
| H | 0.000000 | 0.000000 | 0.000000 |
| J | 0.000000 | 0.000000 | 0.000000 |

Figure 3:
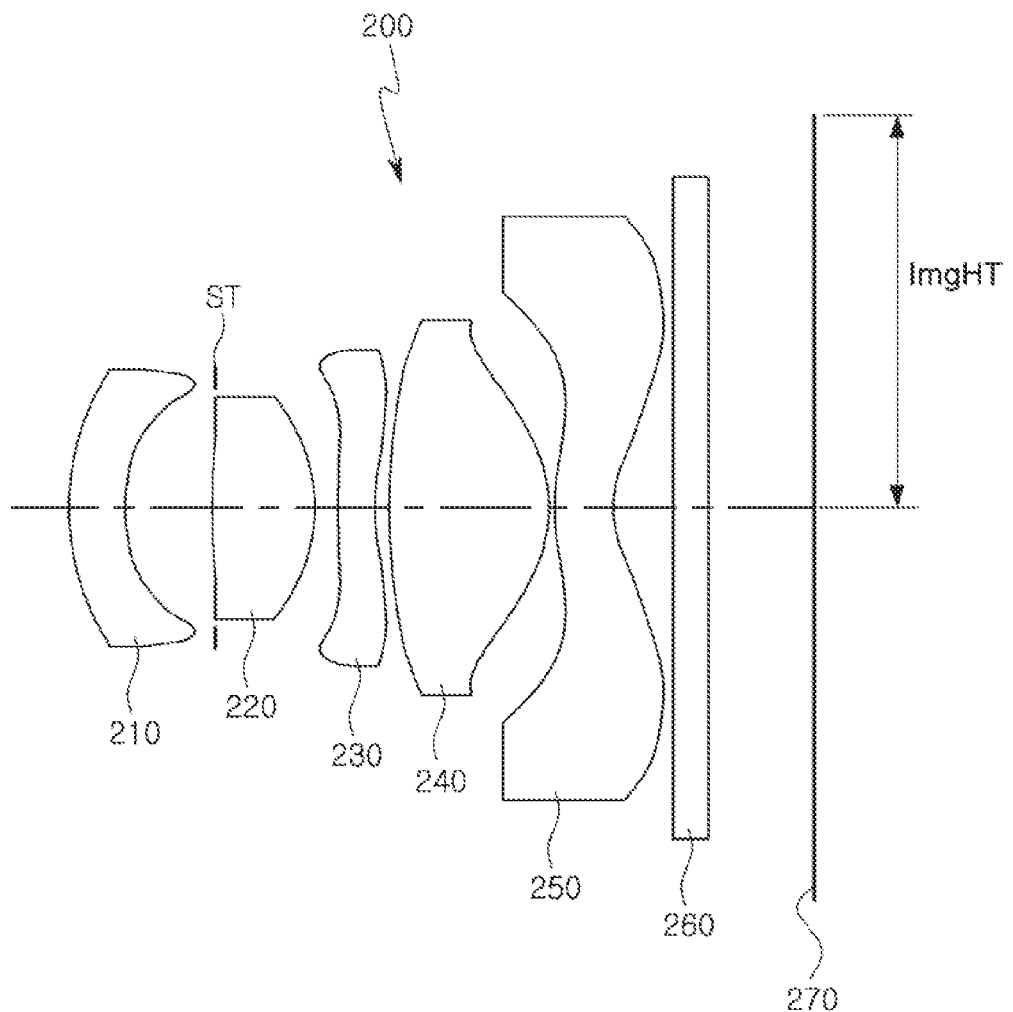
FIG. 3 is a view illustrating an optical imaging system according to an embodiment.

An optical imaging system according to a second embodiment will be described with reference to FIG. 3.

The first lens 210 may have negative refractive power, and an object-side surface thereof may be convex and an image-side surface thereof may be concave. The second lens 220 may have positive refractive power, and an object-side surface thereof may be convex and an image-side surface thereof may be convex. The third lens 230 may have negative refractive power, and an object-side surface thereof may be convex and an image-side surface thereof may be concave. In addition, inflection points may be formed on the object-side surface and the image-side surface of the third lens 230. As an example, the object-side surface of the third lens 230 may be convex in a paraxial portion thereof and be concave in an edge portion thereof, and the image-side surface of the third lens 230 may be concave in a paraxial portion thereof and be convex in an edge portion thereof. The fourth lens 240 may have positive refractive power, and an object-side surface thereof may be convex and an image-side surface thereof may be convex. The fifth lens 250 may have negative refractive power, and an object-side surface thereof may be convex and an image-side surface thereof may be concave. In addition, inflection points may be formed on the object-side surface and the image-side surface of the fifth lens 250. As an example, the object-side surface of the fifth lens 250 may be convex in a paraxial portion thereof and be concave in an edge portion thereof, and the image-side surface of the fifth lens 250 may be concave in a paraxial portion thereof and be convex in an edge portion thereof.

The optical imaging system 200 may include an image sensor 270 forming an imaging plane. The optical imaging system 200 may include a filter 260. The filter 260 may be disposed between the fifth lens 250 and the image sensor 270. The optical imaging system 200 may include a stop ST. The stop ST may be disposed between the first lens 210 and the second lens 220.

In the optical imaging system 200, the first lens 210, the third lens 230, and the fifth lens 250 may have refractive indices greater than those of the other lenses. In detail, the first lens 210, the third lens 230, and the fifth lens 250 may have refractive indices of about 1.661, and the second lens 220 and the fourth lens 240 may have refractive indices of about 1.554, smaller than those of the first lens 210, the third lens 230, and the fifth lens 250.

In the optical imaging system 200, the third lens 230 may have the greatest focal length. In an embodiment, a focal length of the third lens 230 may be about −35.10, and focal lengths of the other lenses may be greater than that of the third lens 230.

Figure 4:
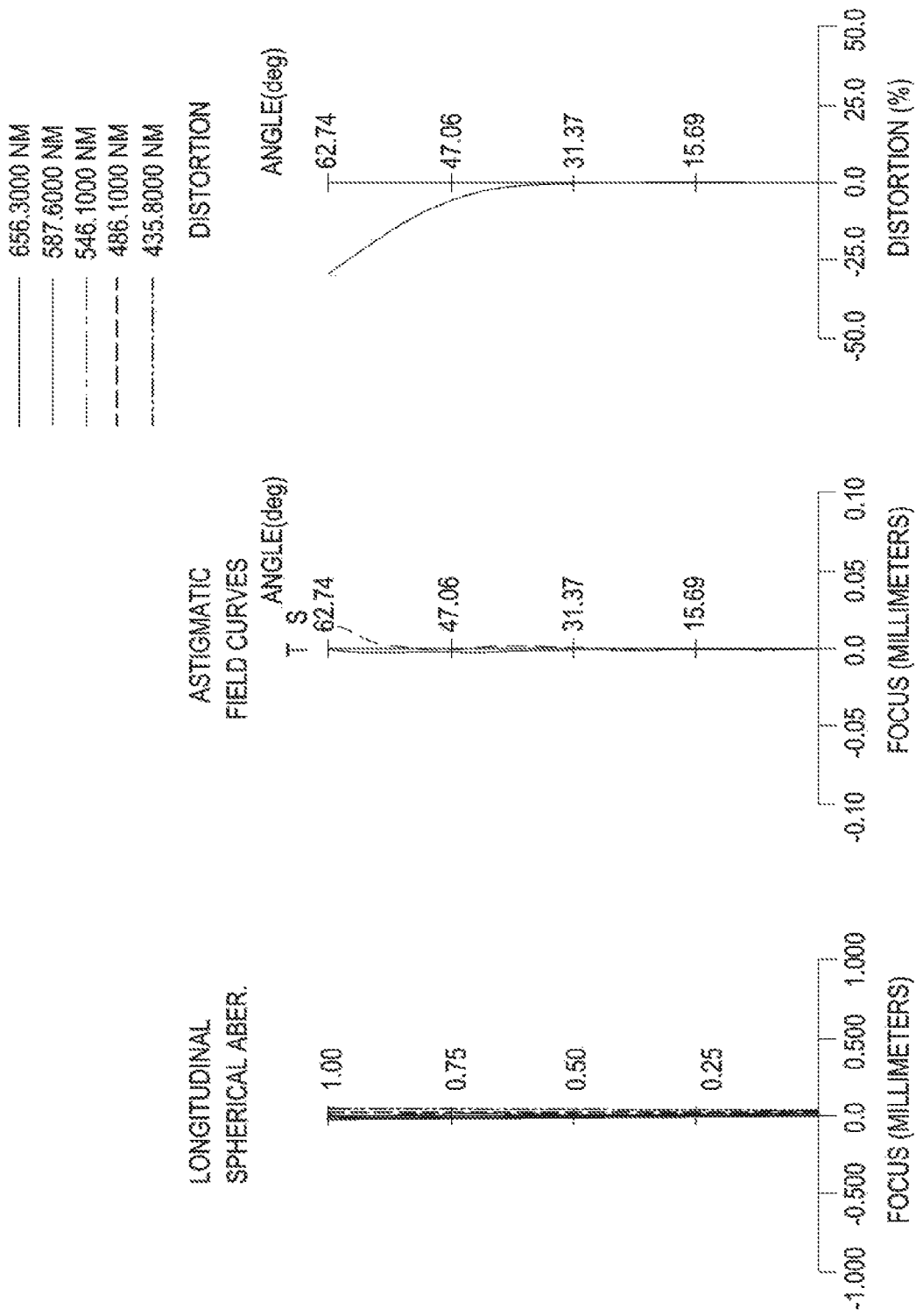
FIG. 4 shows graphs representing aberration curves of an optical imaging system as illustrated in FIG. 3.

The optical imaging system according to an embodiment may have aberration characteristics as illustrated in FIG. 4. Table 3 shows characteristics of lenses of the optical imaging system according to an embodiment, and Table 4 shows aspherical characteristics of the optical imaging system according to an embodiment.

TABLE 3

| Second Embodiment f = 1.76 F No. = 2.26 FOV = 120° TTL = 4.501 | | | | | | |
|---|---|---|---|---|---|---|
| Surface No. | Element | Radius of Curvature | Thickness/ Distance | Refractive Index | Abbe Number | Focal Length |
| S1 | First Lens | 2.1928 | 0.3358 | 1.661 | 20.353 | −3.727 |
| S2 | | 1.0894 | 0.5433 | | | |
| S3 | Second Lens | 5.4370 | 0.5946 | 1.544 | 56.113 | 2.931 |
| S4 | | −2.1687 | 0.1469 | | | |
| S5 | Third Lens | 1.9620 | 0.2300 | 1.661 | 20.353 | −35.104 |
| S6 | | 1.7246 | 0.0950 | | | |
| S7 | Fourth Lens | 13.1390 | 0.9600 | 1.544 | 56.113 | 1.280 |
| S8 | | −0.7166 | 0.0300 | | | |
| S9 | Fifth Lens | 1.3223 | 0.3539 | 1.661 | 20.353 | −1.769 |
| S10 | | 0.5544 | 0.3620 | | | |

TABLE 3-continued

Second Embodiment
f = 1.76 F No. = 2.26 FOV = 120° TTL = 4.501

| Surface No. | Element | Radius of Curvature | Thickness/ Distance | Refractive Index | Abbe Number | Focal Length |
|---|---|---|---|---|---|---|
| S11 | Filter | Infinity | 0.2100 | 1.517 | 64.197 | |
| S12 | | Infinity | 0.6372 | | | |
| S13 | Imaging Plane | Infinity | 0.0024 | | | |

TABLE 4

| | \multicolumn{5}{c}{Second Embodiment} |
|---|---|---|---|---|---|
| | S1 | S2 | S3 | S4 | S5 |
| Radius of Curvature | 2.19279196 | 1.089398458 | 5.436956125 | −2.168731914 | 1.961950655 |
| K | 0.00000 | 0.00000 | −96.80463 | 4.42124 | 0.00000 |
| A | 0.198276 | 0.455134 | −0.107547 | −0.739839 | −0.953608 |
| B | 0.011249 | 0.093926 | 0.692716 | 1.762464 | 1.311834 |
| C | −0.215004 | 1.868629 | −15.616812 | −7.792844 | −4.049826 |
| D | 0.460664 | −10.560375 | 103.040539 | 23.000245 | 10.440480 |
| E | −0.363833 | 37.640371 | −358.854999 | −40.355988 | −14.946486 |
| F | 0.084883 | −45.802151 | 477.321032 | 26.791611 | 8.525191 |
| G | 0.000000 | 0.000000 | 0.000000 | 0.000000 | 0.000000 |
| H | 0.000000 | 0.000000 | 0.000000 | 0.000000 | 0.000000 |
| J | 0.000000 | 0.000000 | 0.000000 | 0.000000 | 0.000000 |
| | \multicolumn{5}{c}{Second Embodiment} |
| | S6 | S7 | S8 | S9 | S10 |
| Radius of Curvature | 1.724601419 | 13.13899039 | −0.716566637 | 1.322344757 | 0.0554389232 |
| K | −4.50605 | 99.00000 | −0.77609 | 0.00000 | −3.66851 |
| A | −0.293012 | 0.255193 | 0.665143 | −0.735327 | −0.273636 |
| B | −0.109564 | −0.636615 | −1.325737 | 0.594517 | 0.204665 |
| C | 0.730042 | 1.097542 | 2.282118 | −0.918076 | −0.111688 |
| D | −0.913554 | −1.127725 | −2.416037 | 1.201210 | 0.039079 |
| E | 0.316668 | 0.632429 | 1.503664 | −1.031307 | −0.008461 |
| F | 0.029463 | −0.154086 | −0.390997 | 0.479508 | 0.001002 |
| G | 0.000000 | 0.000000 | 0.000000 | −0.091447 | −0.000049 |
| H | 0.000000 | 0.000000 | 0.000000 | 0.000000 | 0.000000 |
| J | 0.000000 | 0.000000 | 0.000000 | 0.000000 | 0.000000 |

Figure 5:
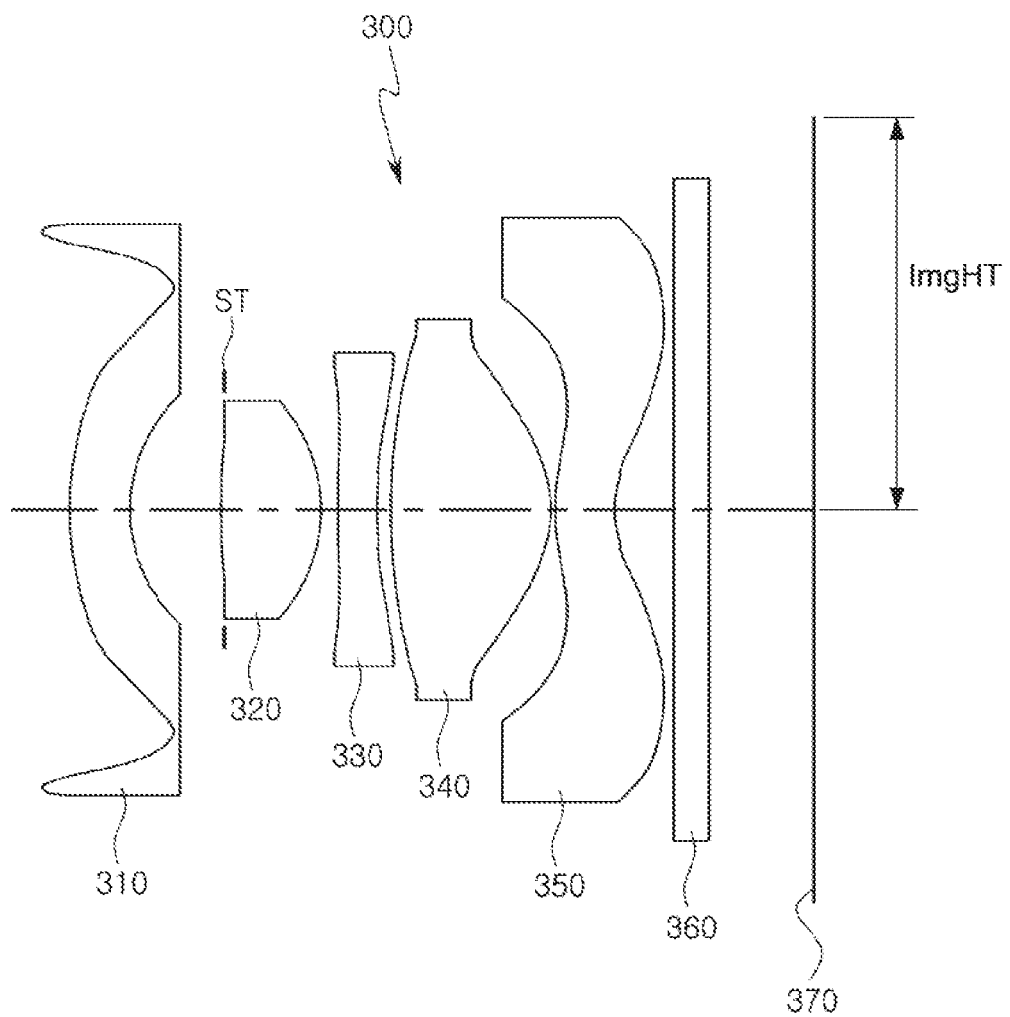
FIG. 5 is a view illustrating an optical imaging system according to an embodiment.

An optical imaging system according to a third embodiment will be described with reference to FIG. 5.

The first lens 310 may have negative refractive power, and an object-side surface thereof may be convex and an image-side surface thereof may be concave. The second lens 320 may have positive refractive power, and an object-side surface thereof may be convex and an image-side surface thereof may be convex. The third lens 330 may have negative refractive power, and an object-side surface thereof may be convex and an image-side surface thereof may be concave. In addition, inflection points may be formed on the object-side surface and the image-side surface of the third lens 330. As an example, the object-side surface of the third lens 330 may be convex in a paraxial portion thereof and be concave in an edge portion thereof, and the image-side surface of the third lens 330 may be concave in a paraxial portion thereof and be convex in an edge portion thereof. The fourth lens 340 may have positive refractive power, and an object-side surface thereof may be convex and an image-side surface thereof may be convex. The fifth lens 350 may have negative refractive power, and an object-side surface thereof may be convex and an image-side surface thereof may be concave. In addition, inflection points may be formed on the object-side surface and the image-side surface of the fifth lens 350. As an example, the object-side surface of the fifth lens 350 may be convex in a paraxial portion thereof and may be concave in an edge portion thereof, and the image-side surface of the fifth lens 350 may be concave in a paraxial portion thereof and be convex in an edge portion thereof.

The optical imaging system 300 may include an image sensor 370 forming an imaging plane. The optical imaging system 300 may include a filter 360. The filter 360 may be disposed between the fifth lens 350 and the image sensor 370. The optical imaging system 300 may include a stop ST. The stop ST may be disposed between the first lens 310 and the second lens 320.

In the optical imaging system 300, the first lens 310, the third lens 330, and the fifth lens 350 may have refractive indices greater than those of the other lenses. In detail, the first lens 310, the third lens 330, and the fifth lens 350 may have refractive indices of about 1.661, and the second lens 320 and the fourth lens 340 may have refractive indices of about 1.554 smaller than those of the first lens 310, the third lens 330, and the fifth lens 350.

In the optical imaging system 300, the third lens 330 may have the greatest focal length. In an embodiment, a focal length of the third lens 330 may be about −8.23, and focal lengths of the other lenses may be greater than that of the third lens 330.

Figure 6:
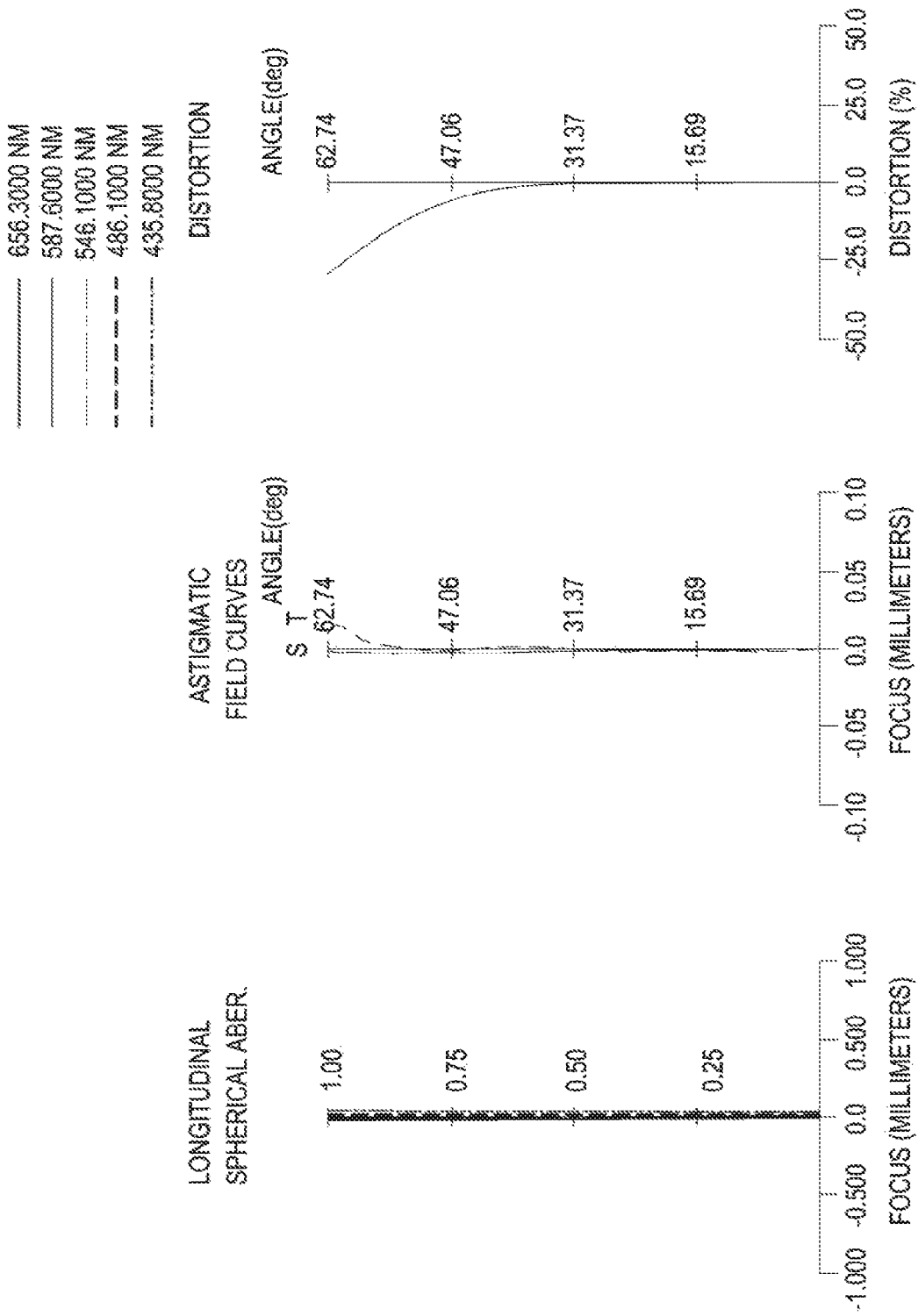
FIG. 6 shows graphs representing aberration curves of an optical imaging system as illustrated in FIG. 5.

The optical imaging system according to an embodiment may have aberration characteristics as illustrated in FIG. 6. Table 5 shows characteristics of lenses of the optical imaging system according to an embodiment, and Table 6 shows aspherical characteristics of the optical imaging system according to an embodiment.

TABLE 5

Third Embodiment
f = 1.75 F No. = 2.28 FOV = 120° TTL = 4.493

| Surface No. | Element | Radius of Curvature | Thickness/ Distance | Refractive Index | Abbe Number | Focal Length |
|---|---|---|---|---|---|---|
| S1 | First Lens | 3.8701 | 0.3481 | 1.661 | 20.353 | −4.144 |
| S2 |  | 1.5466 | 0.5749 |  |  |  |
| S3 | Second Lens | 10.2832 | 0.5834 | 1.544 | 56.113 | 2.332 |
| S4 |  | −1.4184 | 0.1052 |  |  |  |
| S5 | Third Lens | 2.8627 | 0.2300 | 1.661 | 20.353 | −8.226 |
| S6 |  | 1.8154 | 0.1086 |  |  |  |
| S7 | Fourth Lens | 74.0595 | 0.9500 | 1.544 | 56.113 | 1.321 |
| S8 |  | −0.7222 | 0.0300 |  |  |  |
| S9 | Fifth Lens | 1.3105 | 0.3556 | 1.661 | 20.353 | −1.777 |
| S10 |  | 0.5525 | 0.3592 |  |  |  |
| S11 | Filter | Infinity | 0.2100 | 1.517 | 64.197 |  |
| S12 |  | Infinity | 0.6386 |  |  |  |
| S13 | Imaging Plane | Infinity | −0.0007 |  |  |  |

TABLE 6

| | \multicolumn{5}{c}{Third Embodiment} | | | | |
|---|---|---|---|---|---|
|  | S1 | S2 | S3 | S4 | S5 |
| Radius of Curvature | 3.870058073 | 1.546550711 | 10.28321709 | −1.418375059 | 2.862675543 |
| K | 0.00000 | 0.00000 | −96.80463 | 1.91204 | 0.00000 |
| A | 0.246228 | 0.477183 | −0.214778 | −0.618360 | −0.894138 |
| B | −0.091476 | 0.126439 | 0.013139 | 2.565187 | 2.419177 |
| C | −0.027202 | 0.318774 | −4.923829 | −9.702858 | −5.702367 |
| D | 0.156316 | −3.522727 | 21.048482 | 23.019022 | 9.507186 |
| E | −0.112267 | 14.846437 | −42.363130 | −31.387772 | −9.089895 |
| F | 0.021039 | −16.241587 | −9.824457 | 15.776506 | 3.671254 |
| G | 0.000000 | 0.000000 | 0.000000 | 0.000000 | 0.000000 |
| H | 0.000000 | 0.000000 | 0.000000 | 0.000000 | 0.000000 |
| J | 0.000000 | 0.000000 | 0.000000 | 0.000000 | 0.000000 |
|  |  |  | Third Embodiment |  |  |
|  | S6 | S7 | S8 | S9 | S10 |
| Radius of Curvature | 1.815368291 | 74.05948473 | −0.722186702 | 1.31051937 | 0.552533338 |
| K | −1.55644 | 99.00000 | −0.77008 | 0.00000 | −3.63303 |
| A | −0.375929 | 0.283148 | 0.662606 | −0.738227 | −0.271495 |
| B | 0.618328 | −0.613361 | −1.302372 | 0.587993 | 0.191432 |
| C | −0.829356 | 1.057906 | 2.207116 | −0.951832 | −0.098564 |
| D | 0.798591 | −1.108043 | −2.301321 | 1.279264 | 0.031833 |
| E | −0.497980 | 0.658226 | 1.410241 | −1.108475 | −0.006221 |
| F | 0.134589 | −0.167942 | −0.352595 | −0.522214 | 0.000645 |
| G | 0.000000 | 0.000000 | 0.000000 | −0.102222 | −0.000027 |
| H | 0.000000 | 0.000000 | 0.000000 | 0.000000 | 0.000000 |
| J | 0.000000 | 0.000000 | 0.000000 | 0.000000 | 0.000000 |

Figure 7:
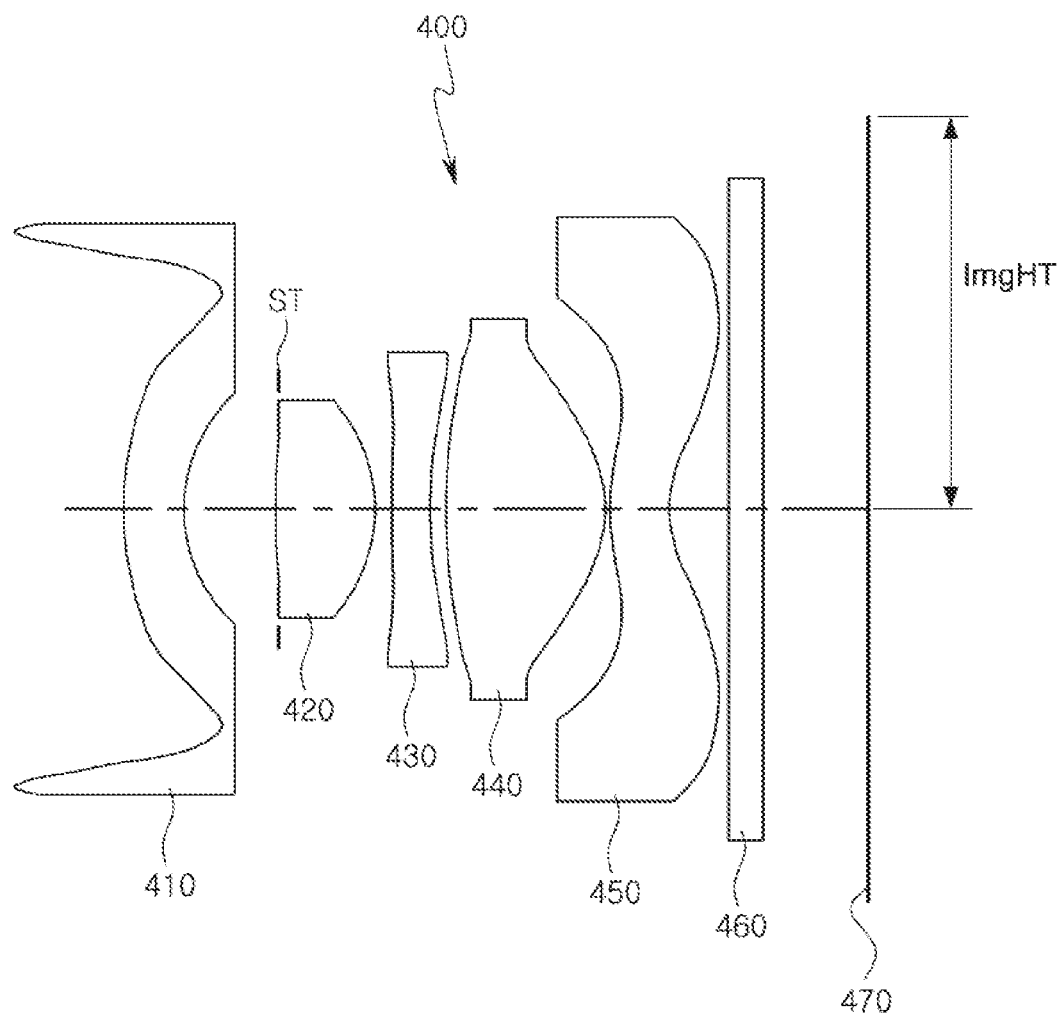
FIG. 7 is a view illustrating an optical imaging system according to an embodiment.

An optical imaging system according to a fourth embodiment will be described with reference to FIG. 7.

The first lens 410 may have negative refractive power, and an object-side surface thereof may be convex and an image-side surface thereof may be concave. The second lens 420 may have positive refractive power, and an object-side surface thereof may be convex and an image-side surface thereof may be convex. The third lens 430 may have negative refractive power, and an object-side surface thereof may be convex and an image-side surface thereof may be concave. In addition, inflection points may be formed on the object-side surface and the image-side surface of the third lens 430. As an example, the object-side surface of the third lens 430 may be convex in a paraxial portion thereof and be concave in an edge portion thereof, and the image-side surface of the third lens 430 may be concave in a paraxial portion thereof and be convex in an edge portion thereof. The fourth lens 440 may have positive refractive power, and an object-side surface thereof may be convex and an image-side surface thereof may be convex. The fifth lens 450 may have negative refractive power, and an object-side surface thereof may be convex and an image-side surface thereof may be concave. In addition, inflection points may be formed on the object-side surface and the image-side surface of the fifth lens 450. As an example, the object-side surface of the fifth lens 450 may be convex in a paraxial portion thereof and be concave in an edge portion thereof, and the image-side surface of the fifth lens 450 may be concave in a paraxial portion thereof and be convex in an edge portion thereof.

The optical imaging system 400 may include an image sensor 470 forming an imaging plane. The optical imaging system 400 may include a filter 460. The filter 460 may be disposed between the fifth lens 450 and the image sensor 470. The optical imaging system 400 may include a stop ST. The stop ST may be disposed between the first lens 410 and the second lens 420.

In the optical imaging system 400, the first lens 410, the third lens 430, and the fifth lens 450 may have refractive indices greater than those of the other lenses. In detail, the first lens 410, the third lens 430, and the fifth lens 450 may have refractive indices of about 1.661, and the second lens 420 and the fourth lens 440 may have refractive indices of about 1.554, smaller than those of the first lens 410, the third lens 430, and the fifth lens 450.

In the optical imaging system 400, the third lens 430 may have the greatest focal length. In an embodiment, a focal length of the third lens 430 may be about −8.85, and focal lengths of the other lenses may be greater than that of the third lens 430.

Figure 8:
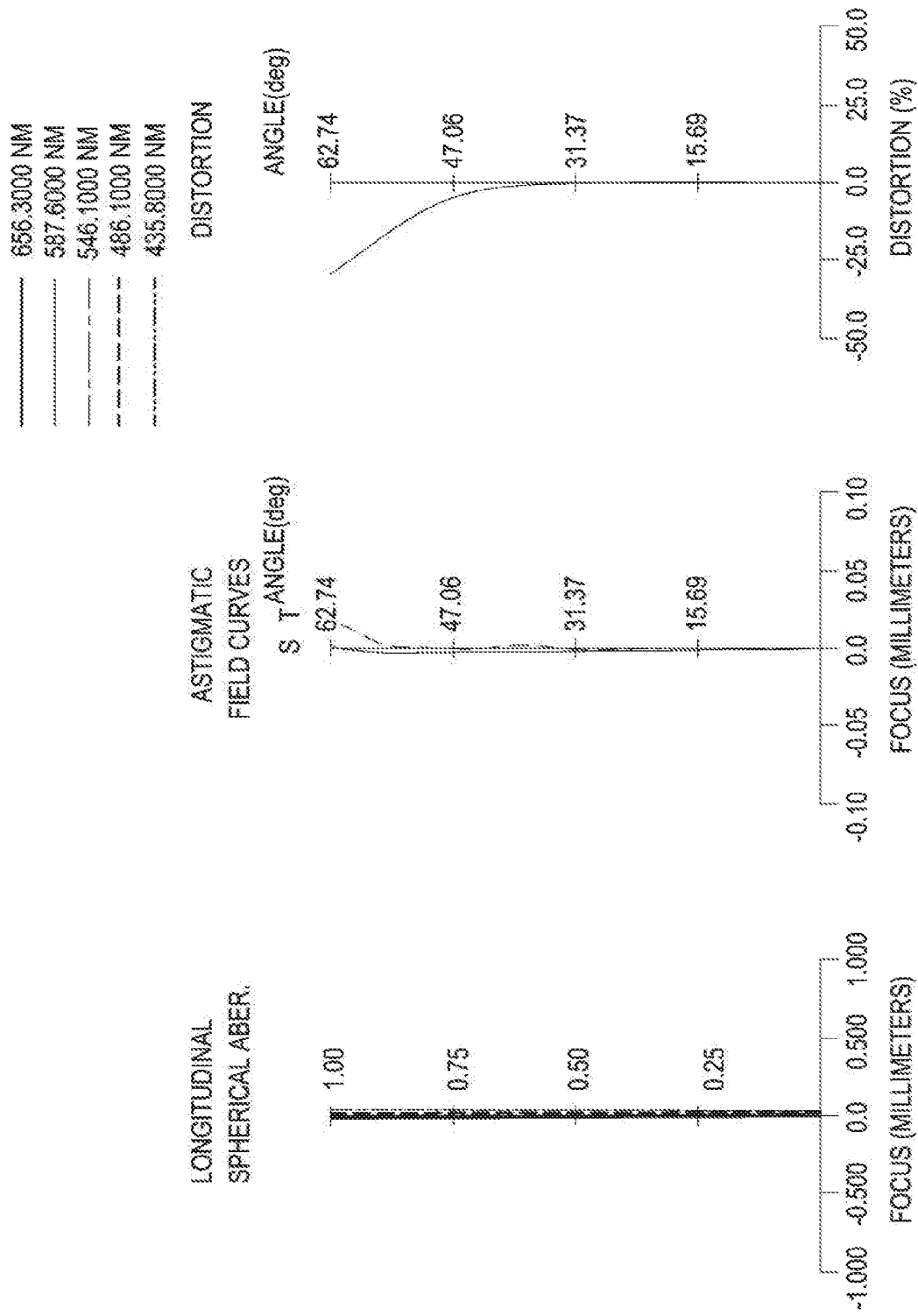
FIG. 8 shows graphs representing aberration curves of an optical imaging system as illustrated in FIG. 7.

The optical imaging system according to an embodiment may have aberration characteristics as illustrated in FIG. 8. Table 7 shows characteristics of lenses of the optical imaging system according to an embodiment, and Table 8 represents aspherical characteristics of the optical imaging system according to an embodiment.

TABLE 7

Fourth Embodiment
f = 1.75 F No. = 2.07 FOV = 120° TTL = 4.493

| Surface No. | Element | Radius of Curvature | Thickness/ Distance | Refractive Index | Abbe Number | Focal Length |
|---|---|---|---|---|---|---|
| S1 | First Lens | 4.0602 | 0.3492 | 1.661 | 20.353 | −4.203 |
| S2 | | 1.5930 | 0.5751 | | | |
| S3 | Second Lens | 8.8363 | 0.5862 | 1.544 | 56.113 | 2.425 |
| S4 | | −1.5141 | 0.1063 | | | |
| S5 | Third Lens | 2.5048 | 0.2300 | 1.661 | 20.353 | −8.853 |
| S6 | | 1.6899 | 0.1106 | | | |
| S7 | Fourth Lens | 37.3602 | 0.9500 | 1.544 | 56.113 | 1.308 |
| S8 | | −0.7191 | 0.0300 | | | |
| S9 | Fifth Lens | 1.3112 | 0.3500 | 1.661 | 20.353 | −1.785 |
| S10 | | 0.5551 | 0.3577 | | | |
| S11 | Filter | Infinity | 0.2100 | 1.517 | 64.197 | |
| S12 | | Infinity | 0.6391 | | | |
| S13 | Imaging Plane | Infinity | −0.0009 | | | |

TABLE 8

| | Fourth Embodiment | | | | |
|---|---|---|---|---|---|
| | S1 | S2 | S3 | S4 | S5 |
| Radius of Curvature | 4.060203826 | 1.5952987031 | 8.836278242 | −1.514104128 | 2.504749789 |
| K | 0.00000 | 0.00000 | −96.80463 | 1.85760 | 0.00000 |
| A | 0.242382 | 0.466606 | −0.171925 | −0.604529 | −0.886692 |
| B | −0.062039 | 0.206024 | 0.092698 | 2.469228 | 2.268378 |
| C | −0.088683 | 0.424040 | −4.927126 | −9.356664 | −5.237799 |
| D | 0.222032 | −5.068666 | 24.940776 | 21.688561 | 8.608267 |
| E | −0.147657 | 18.481333 | −74.903367 | −28.037262 | −8.043410 |
| F | 0.027293 | −18.736071 | 79.648860 | 13.103807 | 3.140271 |
| G | 0.000000 | 0.000000 | 0.000000 | 0.000000 | 0.000000 |
| H | 0.000000 | 0.000000 | 0.000000 | 0.000000 | 0.000000 |
| J | 0.000000 | 0.000000 | 0.000000 | 0.000000 | 0.000000 |

TABLE 8-continued

| | Fourth Embodiment | | | | |
|---|---|---|---|---|---|
| | S6 | S7 | S8 | S9 | S10 |
| Radius of Curvature | −1.689866781 | 37.36016822 | −0.7191191 | 1.311154543 | 0.555075821 |
| K | −1.83097 | 99.00000 | −0.77126 | 0.00000 | −3.78121 |
| A | −0.381078 | 0.285630 | 0.703664 | −0.739670 | −0.254505 |
| B | 0.589971 | −0.582260 | −1.409937 | 0.664995 | 0.177839 |
| C | −0.393627 | 0.942864 | 2.444889 | −1.135120 | −0.093895 |
| D | 0.775827 | −0.942664 | −2.584995 | 1.533753 | 0.030426 |
| E | −0.519579 | 0.562125 | 1.559771 | −1.356597 | −0.005865 |
| F | 0.148324 | −0.143887 | −0.380011 | 0.647281 | 0.000596 |
| G | 0.000000 | 0.000000 | 0.000000 | −0.125703 | −0.000024 |
| H | 0.000000 | 0.000000 | 0.000000 | 0.000000 | 0.000000 |
| J | 0.000000 | 0.000000 | 0.000000 | 0.000000 | 0.000000 |

Table 9 represents values of Conditional Expressions of the optical imaging systems according to the first to fourth embodiments.

TABLE 9

| Conditional Expression | First Embodiment | Second Embodiment | Third Embodiment | Fourth Embodiment |
|---|---|---|---|---|
| F No. | 2.26 | 2.26 | 2.28 | 2.07 |
| TTL/ImgH | 1.84 | 1.97 | 1.97 | 1.97 |
| f | 1.76 | 1.76 | 1.75 | 1.75 |
| FOV | 120° | 120° | 120° | 120° |
| CT4/ET4 | 3.49 | 2.91 | 2.88 | 2.86 |
| V1−V2 | −35.76 | −35.76 | −35.76 | −35.76 |
| V4−V5 | 35.76 | 35.76 | 35.76 | 35.76 |
| CT5/sag5 | 1.54 | 0.51 | 0.53 | 0.53 |
| N1 | 1.661 | 1.661 | 1.661 | 1.661 |
| N3 | 1.661 | 1.661 | 1.661 | 1.661 |
| N5 | 1.661 | 1.661 | 1.661 | 1.661 |
| |f1/f| | 1.862 | 2.117 | 2.368 | 2.402 |
| |f3/f| | 12.157 | 19.945 | 4.700 | 5.059 |

In the optical imaging system, a focal length of the first lens may be in a range of about −5.0 to about −2.5. In the optical imaging system, a focal length of the second lens may be in a range of about 2.0 to about 4.0. In the optical imaging system, a focal length of the third lens may be substantially determined in a range of about −50 to about −6.0. In the optical imaging system, a focal length of the fourth lens may be in a range of about 1.0 to about 3.0. In the optical imaging system, a focal length of the fifth lens may be in a range of about −3.0 to about −1.0. An overall focal length of the optical imaging system may be substantially determined in a range of about 1.0 to about 1.8. A total length (TTL) of the optical imaging system may be in a range of about 3.8 to about 4.8.

As set forth above, according to an embodiment, an optical imaging system having a low F number (No.) and a wide field of view may be implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, and a fifth lens sequentially disposed in ascending numerical order from an object side of the optical imaging system toward an imaging plane of the optical imaging system,
wherein the third lens has a refractive index of about 1.6 or more,
a field of view of the optical imaging system is 100° or more,
the first lens has a negative refractive power,
the second lens has a convex image-side surface in a paraxial region thereof, and a focal length in a range of 2.0 mm to 4.0 mm,
an image-side surface of the third lens is concave in a paraxial region thereof,
an object-side surface of the fourth lens is convex in a paraxial region thereof,
an object-side surface of the fifth lens is convex in a paraxial region thereof,
the optical imaging system has a total number of five lenses with refractive power,
f≤1.76, where f is an overall focal length in millimeters of the optical imaging system, and
TTL is in a range of 3.8 mm to 4.8 mm, where TTL is a distance from an object-side surface of the first lens to the imaging plane.

2. The optical imaging system of claim 1, wherein the object-side surface of the first lens is convex in a paraxial region thereof.

3. The optical imaging system of claim 1, wherein an object-side surface of the second lens is convex in a paraxial region thereof.

4. The optical imaging system of claim 1, wherein an object-side surface of the third lens is convex in a paraxial region thereof.

5. The optical imaging system of claim 1, wherein an F number of the optical imaging system is less than about 2.3.

6. An optical imaging system comprising:
a first lens, a second lens, a third lens, a fourth lens, and a fifth lens sequentially disposed in ascending numerical order from an object side of the optical imaging system toward an imaging plane of the optical imaging system, wherein the third lens has a refractive index of about 1.6 or more and a convex object-side surface in a paraxial region thereof, a field of view of the optical imaging system is 120° or more, the first lens has a negative refractive power, and a convex object-side surface in a paraxial region thereof, an image-side surface of the second lens is convex in a paraxial region thereof, an image-side surface of the third lens is concave in a paraxial region thereof, an object-side surface of the fourth lens is convex in a paraxial region thereof, an object-side surface of the fifth lens is convex in a paraxial region thereof, the optical imaging system has a total number of five lenses with refractive power, f≤1.76, where f is an overall focal length in millimeters of the optical imaging system, and an F number of the optical imaging system is less than 2.3.

7. The optical imaging system of claim 6, wherein any one of the first lens, the third lens, and the fifth lens, or each of any combination of any two or more of the first lens, the third lens, and the fifth lens, has a refractive index of about 1.66 or more.

8. The optical imaging system of claim 6, wherein TTL/ImgHT<2.0, where TTL is a distance from the object-side surface of the first lens to the imaging plane, and ImgHT is one half of a diagonal length of the imaging plane.

9. The optical imaging system of claim 6, wherein 2.86 CT4/ET4, where CT4 is a thickness of an optical axis portion of the fourth lens, and ET4 is a minimum thickness of an edge portion of the fourth lens.

10. The optical imaging system of claim 6, wherein 0.53<CT5/sag5, where CT5 is a thickness of an optical axis portion of the fifth lens, and sag5 is a SAG (sagitta) at an edge of an image-side surface of the fifth lens.

11. The optical imaging system of claim 6, wherein |f1/f|<4.0, where f is an overall focal length in millimeters of the optical imaging system, and a f1 is a focal length in millimeters of the first lens.

12. The optical imaging system of claim 6, wherein the fifth lens has a negative refractive power.

13. The optical imaging system of claim 6, wherein the fifth lens has a concave image-side surface in a paraxial region thereof.

14. The optical imaging system of claim 6, wherein the third lens is concave in an edge portion thereof.

15. The optical imaging system of claim 6, wherein the third lens has a negative refractive power.

16. The optical imaging system of claim 6, further comprising a filter and an image sensor wherein the filter is disposed between the fifth lens and the image sensor.

17. An optical imaging system comprising:
a first lens, a second lens, a third lens, a fourth lens, and a fifth lens sequentially disposed in ascending numerical order from an object side of the optical imaging system toward an imaging plane of the optical imaging system, wherein the third lens has a refractive index of about 1.6 or more, a field of view of the optical imaging system is 120° or more, the first lens has a negative refractive power, and a convex object-side surface in a paraxial region thereof, an image-side surface of the second lens is convex in a paraxial region thereof, an image-side surface of the third lens is concave in a paraxial region thereof, an object-side surface of the fourth lens is convex in a paraxial region thereof, an object-side surface of the fifth lens is convex in a paraxial region thereof, the optical imaging system has a total number of five lenses with refractive power, f≤1.76, where f is an overall focal length in millimeters of the optical imaging system, and an F number of the optical imaging system is less than 2.3, and 2.86≤CT4/ET4, where CT4 is a thickness of an optical axis portion of the fourth lens, and ET4 is a minimum thickness of an edge portion of the fourth lens.

* * * * *